United States Patent [19]
Livingston

[11] 3,844,481
[45] Oct. 29, 1974

[54] POWERED MOBILE SPRAY IRRIGATION FOR PRODUCTIVE CROP SEWAGE UTILIZATION

[76] Inventor: David P. Livingston, R.R. No. 2, Washington, Iowa 52353

[22] Filed: Jan. 22, 1971

[21] Appl. No.: 108,932

[52] U.S. Cl............................. 239/177, 239/188
[51] Int. Cl........................... B05b 1/20, B05b 3/00
[58] Field of Search............... 239/184, 177, 188

[56] References Cited
UNITED STATES PATENTS

| | | | |
|---|---|---|---|
| 1,953,223 | 4/1934 | Hartley et al.......... | 239/177 X |
| 3,493,176 | 2/1970 | Kinkead.................. | 239/177 X |
| 3,558,257 | 1/1971 | Harris..................... | 239/177 X |
| 3,558,258 | 1/1971 | Johnson, Jr............. | 239/177 |

Primary Examiner—Robert S. Ward, Jr.
Attorney, Agent, or Firm—Duane C. Bowen

[57] ABSTRACT

Continuously moving spray irrigation makes economic agricultural utilization of sewage. Sewage may be injected into a supplemental water stream and particle size screening and/or reducing means may be provided intermediate the irrigation rig and the sewage source, which may be a lagoon. Adaptation is made for freezing conditions.

17 Claims, 9 Drawing Figures

INVENTOR.
DAVID P. LIVINGSTON

BY
Duane C. Bowen
ATTORNEY

INVENTOR.
DAVID P. LIVINGSTON
BY Duane C. Bowen
ATTORNEY

POWERED MOBILE SPRAY IRRIGATION FOR PRODUCTIVE CROP SEWAGE UTILIZATION

BRIEF SUMMARY OF THE INVENTION

My invention concerns methods of and means for economic disposal of sewage by treating it generally consistently with other agricultural irrigation and fertilization of land. The means and method include spraying the sewage on agricultural land with a continuously moving rig thereby spreading the sewage evenly on the land and avoiding puddling so that crop growth on the land is enhanced similarly to the normal purpose of agricultural land irrigation and fertilization. The system is keyed to economics and labor is minimized.

I have been acquainted with both the irrigation field in general and with the problems of sewage disposal as to cannery wastes over a period of years (as well as being otherwise related to agriculture). More recently I was brought into contact with a company (with which I subsequently became financially and otherwise involved) needing additional capital that was engaged in the design and manufacture of advanced irrigation systems. It was at that point I conceived of the basic concept of sewage disposal through powered mobile pivotal agricultural spray irrigation rigs and treating sewage disposal from the viewpoint of economic agricultural crop irrigation and fertilization, rather than from the viewpoint of sewage disposal as a problem of minimizing ecological damage balancing against disposal costs. I conceived that it was necessary from the viewpoints of both ecology and sound crop production to avoid puddling on the land, the former viewpoint being concerned with odor and contamination and the latter viewpoint being concerned with handling of moisture on soil both to conserve moisture and to avoid soil damage. My definition of requirements led to specification of a continuously moving spray irrigation system. It has become apparent to me that minimization of manpower is one of the most basic factors of agriculture if one is to stay competitive in that rapidly changing field, and it thus appeared mandatory to me that the total sewage disposal system (most often viewed as an economic detriment) be keyed to the very minimum of manpower in order for sewage disposal to best become an agricultural asset, and my design uses the minimum of manpower. To restate, I think the key to solving sewage disposal problems in many communities is to approach the matter from the viewpoint of a competitive farmer who is able to profit in the complex, most difficult, and rapidly changing business of today's agriculture.

The objectives of my invention include, therefore: to devise means of and method for best agricultural utilization of sewage as an economic asset through irrigation; to minimize manpower; to treat soil efficiently from a crop production viewpoint, while also avoiding sewage odor or contamination; to design a total system for land irrigation from the source of sewage to the point of land irrigation, including, as required, providing for injection into a supplemental water system, providing screening or particle size reduction, and providing adaptation for freezing conditions.

My invention will be best understood, together with additional objectives and advantages thereof, from the following description, read with reference to the drawing, in which:

FIG. 4 is a side view, in essentially diagrammatical form, of screening means for sewage, shown as installed in a laggon or the like.

Figure 1:
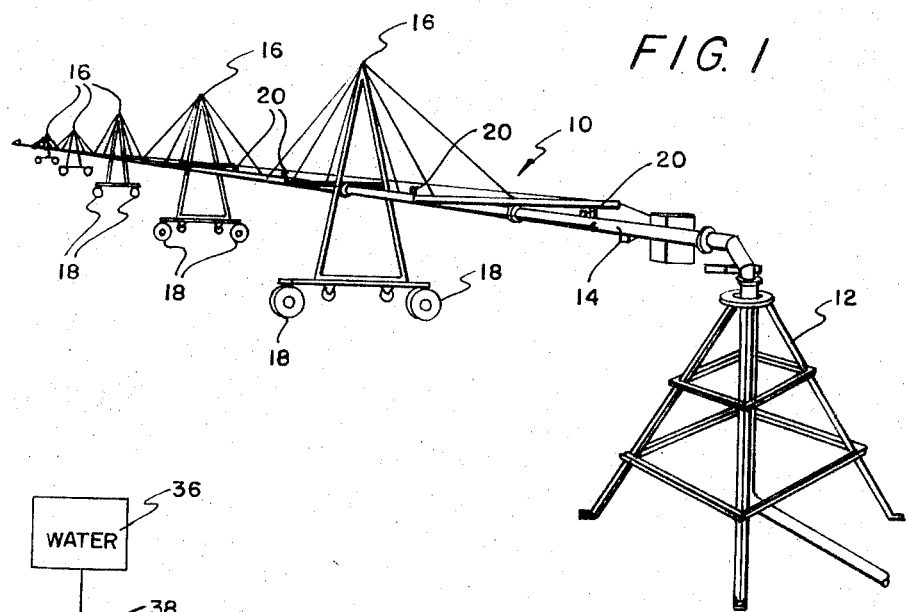
FIG. 1 is a perspective view of continuously moving, pivotal spray irrigation apparatus used in the specific embodiment of my invention.

A primary limitation to using liquid sewage components on land is to essentially regard the process as sewage disposal rather than crop irrigation and fertilization. If the former attitude is present, the tendencies are: (a) to only use such portions of available community sewage as are not disposed of otherwise, (b) to view the disposal as uneconomic, and (c) to apply the sewage to the maximum the land can possibly take to an insufficient area. If the latter attitude is present, the design can become: (a) endeavoring to use all suitable sewage (to avoid wasting a resource), (b) conceiving of materials for crop irrigation and fertilization as being a productive asset (whether or not the total sewage system cost of a community can be priced out in the commodity), and (c) to applying the sewage to sufficient land area to make the most productive crop use of water and fertilizer. I base my system essentially on the latter consideration, which means, among other things, that: (a) costs must be carefully controlled, particularly, as in other forms of modern agriculture, manpower, and (b) the land and crops raised thereon should have, essentially, only that amount of water and fertilizer applied thereto that will make crops most economic, or, if there is not enough land available to achieve that objective, to use only that amount of water and fertilizer that will not work injury to the land as to its crop productivity over a period of years.

Having thus given some of the basic parameters of my design, I will now specifically describe a specific embodiment of my sewage disposal system. This specific embodiment will have similarities to parts of the Muskegon County Plan for Managing Waste Water, in the State of Michigan. I have taken part in the development of that Plan, Including informing the pertinent authorities of my concepts on sewage disposal and including much of the disclosure herein. The Plan at this point contemplates irrigation of up to 10,000 acres of curently unproductive land. The waste land is expected to include that from all or portions of ten jurisdictions including: Cities of Muskegon, Muskegon Heights, North Muskegon, Norton Shores, and Roosevelt Park, and the Townships of Egelston, Fruitport, Laketon, Muskegon, and Dalton. I have also been involved with similar systems for other communities particularly adjacent to the Great Lakes. See Saturday Review, "Reviving the Great Lakes," by John R. Shaeffer, Nov. 7, 1970, pages 62–65, i.e., page 64:

"Bauer's system finally called for the effluent to be piped from the storage lagoons to rotary irrigation rigs...."

Background references on sewage treatment and disposal and irrigation with sewage (some including references to my irrigation system) follow:

a. University of Chicago Magazine, Volume LXII, Number 6, May/June 1970, page 20.

b. Muskegon County Waste Water Treatment Plan (pamphlet).

c. Manual of Instructions for Sewage Treatment Plant Operators, Health Education Service, New York State.

d. Agricultural Utilization of Sewage Effluent and Sludge, An Annotated Bibliography, Federal Water Pollution Control Administration, January, 1968.

e. Penn State Studies 23, "Waste Water Renovation and Conservation," Copyright 1967, The Pennsylvania State University.

f. "Ultimate Sludge Disposal and Soil Improvement," by James O. Evans, Water and Waste Engineering, June, 1969.

My usage of the term "sewage" will be in accordance with the above publications, particularly the Manual of Instructions. One statement of the meaning of sewage is the water supply of a community after it has been fouled by various uses including domestic sewage, industrial sewage, storm drainage, etc. Industrial sewage is meant to include the sewage from manufacturing operations, dairies, canneries and other fruit and vegetable processors, packing houses, breweries and distilleries, stock yards (even those on farms on occasion, such as farms having large feed lots), etc. It is recognized that some industrial sewage will have contaminants that must be specially treated before disposal and that some industrial sewage will have contaminants making it unsuitable for use on agricultural land even with special treatment, but such exceptions to usefulness of sewage for agricultural purposes should not interfere with my general usage of the word "sewage" as such exceptions are merely a matter for the judgment of sewage treatment plant operators.

There are various ways to treat sewage and on occasion sewage may be used untreated (or raw or fresh). Such treatments include primary and secondary treatment, digested sludge, activated sludge, chemically treated sewage, sewage after treatment by trickling filters, etc. In my usage of the term "sewage," I do not usually differentiate the types of treatment to which the sewage has been subjected, as my system can be used to apply the various forms of sewage to land and it is a matter for the pertinent authorities to decide what treatment, if any, is given to the sewage before it is applied to land. One exception, of course, is dried sludge as my invention is limited to the application of sewage in a pumpable form at the time of irrigation, and this can be termed "liquid" in the sense that any solids are in suspension or are otherwise carried by the liquid stream. It will be clear hereafter that screening or the like is used to avoid solids in the liquid flow of a size which would cause blocking of irrigation nozzles. Nozzles can be provided to clear ¼ inch particles, so ¼ inch screening usually will be applicable. Typically in sewage, solids are less than 0.1 percent by weight, so sewage is mostly water, a point that is often overlooked and which suggested to me that sewage can be viewed essentially as water, a most valuable commodity to a farmer if used according to the best irrigation practices to increase crop productivity.

In certain systems I do distinguish effluent and sludge, manure, or other material with more solids content than effluent, i.e., I mix sources of effluent and sludge or the like (sometimes with added water) but in each case the material with more solids content has enough liquid to be pumpable. "Effluent," of course, is the water-like result of some type of sewage treatment, such as by separation of effluent from sludge in sewage treatment.

I limit my sewage disposal to what the land can take without puddling. This limitation usually takes care of the problem of underground water contamination by application of excessive amounts of water particularly with too permeable soil, i.e., soil having too high percolation rate and particularly if the underground water is close to the surface. Another reason to avoid puddles is to avoid obnoxious odors due to biological activity in puddle conditions leading to putrescence causing such odors (particularly by anaerobic decomposition). Puddles containing pathogenic organisms can be considered a particular hazard. Puddles can cause a mosquito problem. Hydrogen sulfide, a foul-smelling gas, is the result of anaerobic decomposition of sulfur-bearing compounds. Another reason to avoid puddling is to avoid completely saturated or water-logged soils. Saturation, if prolonged, or unless very infrequent, produces a number of undesirable results including harm to or destruction of agricultural crops, and eventual reduction in soil permeability.

Related to the avoidance of puddling is the general philosophy of my irrigation method. Basically, I approach the application of sewage to agricultural land from the viewpoint of the good, progressive, modern farmer, meaning that amount of liquid and solids should be applied to the land which will be most productive of crops, immediately and over a period of years. To the extent more liquid and solids have to be disposed on the land than can be justified by water and nutrition needs of the crops, then I limit application to amounts that will not be injurious to the crops and will not be injurious to the land as to future crop productivity. If enough land is available, which is preferable and possible in most locations, then the former objective can be obtained. If not enough land can be made available, then the latter objective should represent the maximum disposal rate of liquid and solids as otherwise the disposal program is undesirable as progressively producting agriculturally nonproductive land. Harm to the soil by too heavy application of liquids and solids results in creation of biological slimes, clogging of the soil with particulate matter, deterioration of soil percolation rates, oil and grease buildup in the soil, developing toxicity to vegetation (particularly crop vegetation), producing anaerobic in-soil conditions, insect problems, excessive salts particularly sodium and barium, attack of microorganisims on organic materials binding soil into aggregates, etc. Such soil deterioration also implies danger of contamination to underground water. An ultimate in soil degradation would be the creation of swamp type conditions.

As indicated above, I believe the most basic considerations in sewage disposal on agricultural land is to provide ample area so that the amount of sewage applied to the land can be primarily or preferably governed by the needs of the crops for liquid and solids irrigation. The ideal situation, whether or not it can be achieved, would be for the complete cost of sewage disposal to be justified by increased crop productivity. The chief thing to be avoided is sewage disposal on too little land, which has been the pattern in the past. I believe the key to irrigating sufficient land to meet the objective of applying according to crop needs (or at least to avoiding land deterioration) is to provide irrigation equipment of the continuously moving, automated, large type shown in FIG. 1, which is adapted to irrigate large land areas with minimum equipment and labor costs. This type of equipment avoids the temptation, and the chief limitation of prior irrigation solid set systems, of irrigating too little land (or irrigating to the maximum extent the land can take without regard to crop justification) due to the cost of equipment per acre, the amount of manpower needed to set up and operate the equipment, need for frequent operator attendance, etc. Some of the best crops for sewage disposal are corn or other grain crops, alfalfa or other hay crops, or grasses for grazing, and it will be understood that these crops variously do not require high irrigation rates of liquids and solids for best productivity, or can be injured by too high irrigation rates. Certain types of trees may be raised as "crops" on land irrigated by my equipment, such as orchards of banana trees or orange trees, tree farms (nursery stock), etc. The main limitation is one of height. The mobile towers I use to support the irrigation conduit can be raised or extended from a usual lower height to a higher height to clear 20 foot tree growth by the conduit, for example.

When I use the terms "puddles" and "puddling," these are readily understandable terms to farmers or others qualified in the agricultural arts and means ready incorporation of liquids into the soil. If puddles are observed an hour or two after irrigation, then too much water has been applied. In fact, puddled water observed a few minutes after irrigation indicates excessive irrigation, as a general parameter of operation, although there can be exceptions such as land irregularity draining to a small depression, any dwelling of irrigation equipment due to loss of traction or difficult traction, etc. The ideal condition, which variously can be obtained, occurs on flat land highly permeable by cultivation or otherwise, in which the soil is merely moistened during irrigation but no water can be observed on the soil except for the moistness of the soil. Qualified personnel deciding when to irrigate, the duration of operation, and the rate of irrigation can readily operate continuously moving, automatic, self-propelled irrigation equipment to avoid puddling without material variance, upon becoming acquainted with my method of sewage disposal.

FIG. 1 shows irrigation apparatus 10 of rotary or pivotal, continuously operated, self-propelled, automated, sprinkler type in which a stationary pivot or pivot tower 12 pivotally supports one end of a conduit 14. A series of support and traction units or towers 16 are provided along the length of conduit 14 to support the conduit and power its movement in a cycle of a circle or a partial circle or arc around pivot 12. To give some idea of scale, towers 16 may be about 100 feet apart and there may be as many as 13 towers, which means conduit 14 may be about 1,300 feet long and will irrigate about a quarter section (160 acres) in one 360° rotation. Common speeds of rotation would be from about 16 hours to about 110 hours per rotation. One irrigation rig of this type is disclosed in the patent application Ser. No. 816,923, filed Apr. 17, 1969, by John R. Thomas, entitled "Mobile Irrigation Apparatus," which discloses the equipment referred to above involved in my conception of the present invention. Such an irrigation rig can have its supports 16 powered by water, electricity, hydraulics, etc., the Thomas rig being preferably hydraulically powered to continuously drive wheels 18 during operation (except in an event such as the stopping of one or more towers while other towers catch up to maintain whatever alignment of conduit 14 is selected) by means of rotary hydraulic motors. On some pivotal rigs, crawlers or even sliding feet may be substituted for wheels. Note there are other pivotal irrigation rigs, such as shown by Olson in U.S. Pat. No. 3,386,661, in which reciprocating hydraulic or other pistons and cylinders are used to drive tower 16, converted to wheel drive by ratchet and pawl means, so that wheel drive is by a series of strokes. For purposes of the present disclosure, such drive is still defined as "continuous," i.e., the powering input is continuous although the wheel output is a regular intermittent drive. I am distinguishing as not being continuously driven an irrigation rig which is taken from one stationary position to another stationary position, whether the irrigation equipment is a solid set picked up and laid down, whether there are wheels permitting the irrigation equipment to be towed from one stationary location to another, or whether even the irrigation equipment has gas engines which may be started to self-propel the irrigation equipment to move from one stationary position to another. Note that such stationary equipment during change from one position to another requires constant operator attendance and always or almost always the equipment will have to be manually disconnected from a water source at the first stationary position and reconnected to a water source at the second stationary position. In the type of pivotal irrigation equipment shown in the drawings and referenced in Thomas or Olson, the operator can start the equipment and go away for the 16–110 hours to accomplish 360° rotation, for example. Such equipment has means for automatic shut-off in case of equipment failure, so an operator is not needed. However, a prudent operator will usually check back at least once a day so that he will discover any such shut-off, etc., as he wants the land to be irrigated at that time, usually without delay. In other words the equipment 10 is automatic, self-propelled and unattended in continuous movement during an irrigation cycle, whether or not the operator may check in during the cycle. Such automated, self-propelled, unattended, continuously moving irrigation rigs appear to be limited at this time to pivotal irrigation equipment with the possibly applicable exception of the newly introduced continuously moving so-called "Giant Guns." The equipment may be called "continuously operated" although at the end of a cycle of movement pivoting through a selected arc, operation terminates, after a period of hours or days.

Figure 3:
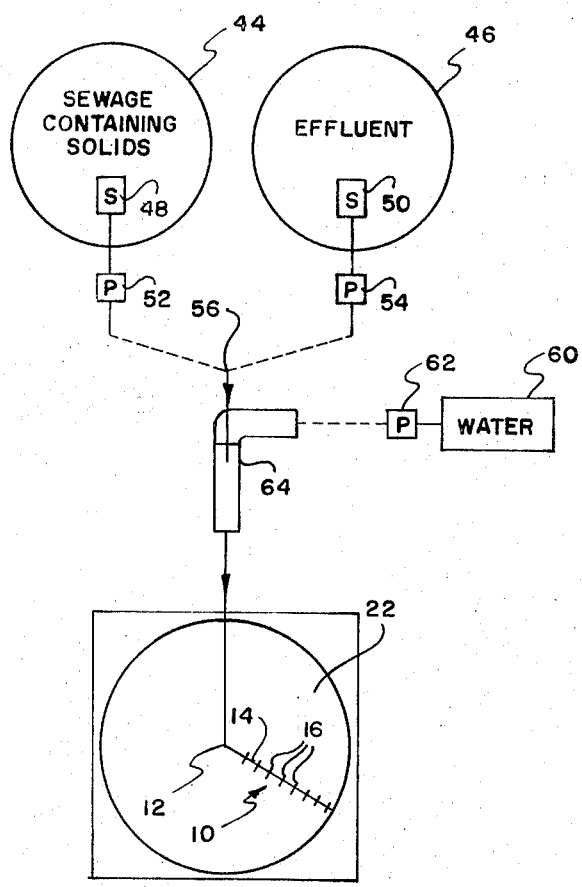
FIG. 3 is a diagrammatical view of my sewage ulitization system of a configuration somewhat more complex than that viewed in FIG. 2.

Conduit 14 has a series of irrigation nozzles 20 upstanding from the upper surface (except in the freezing configuration shown in FIGS. 6–9) of conduit 14 and spaced therealong. Effective size of nozzles and rate of water sprinkling will vary increasingly in series out from pivot 12, as this will be necessary to achieve a relatively even irrigation of sewage over the area of land 22 (FIG. 3). As before indicated, the size of screening of sewage will determine minimum nozzle size, of which ¼ inch is an example.

Figure 2:
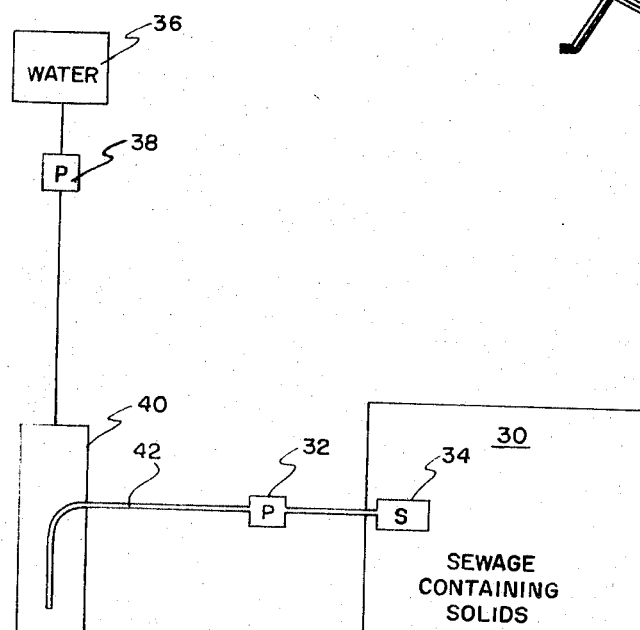
FIG. 2 is a diagrammatical view of a portion of my sewage utilization system.

FIG. 2 shows an example of apparatus feeding sewage to irrigation rig 10. A source of sewage 30 can be a lagoon, a sewage treatment plant, a railroad tank car, a semi-trailer tank truck, a pipe line from a community, etc. The type of source will be governed by various factors such as the distance from the collecting point for sewage, the comparative cost factors of different forms of transport, the type of processing (if any) the sewage has been given, whether primary or secondary treatment, the type of sewage the community produces, etc.

As before indicated, the type of sewage at source 30 can be fresh, subjected to primary treatment, subjected to secondary treatment, etc., and can be only effluent or can have considerable solids content such as sludge, sewage solids not treated to a sludge condition, manure, cannery wastes, etc. The basic requirement of the sewage is that it be pumpable by pump 32. Screening at 34 by suitable screening means will be required if the source can contain solid particles too large for irrigation rig nozzles 20.

Merely providing that the sewage at source 30 is pumpable by pump 32 does not insure that the sewage can be pumped at velocities suitable for spray irrigation, i.e., the solids content may be too high. In some systems of this type it will be feasible to deliver the output of pump 32 directly to irrigation rig. 10. In other system conditions, injection of the output of pump 32 into a water stream will be needed, as provided in the system shown in FIG. 2. A source of water 36 (which could be a well, a connection to a community water system, etc.) is provided with a pump 38. Injector means 40 is provided and the output line 42 from sewage pump 32 injects the sewage into the water stream from pump 38. Pump 38 will be operated to give the water sufficient velocity to pick up the sewage from line 42, to propel the mixture of water and sewage to irrigation rig 10, and to spray the mixture from nozzles 20. Unless the water is merely added to the sewage to provide added crop watering, it will be understood that the purpose of the water is to dilute the sewage and to provide velocity lacking from the output of pump 32, which means that the velocity of water from pump 38 is greater than the velocity of sewage from pump 32. The needed or applicable velocities and relative velocities of pumps 32,38 will depend on various factors such as the amount of solids in the sewage, the distances involved from sources 34, 36 to rig 10, the pipe diameters and resistance, etc. The injection means 40 is shown schematically as this is a straightforward injection system and can be readily specified or designed and sized for a particular installation by routine engineering. Note that the output line 42 from pump 32 is positioned in injection means 40 directed downstream to inject sewage into the water stream of the output line from pump 38, in an injection manner. If the pressure or velocity of the stream from pump 38 is in excess of the pressure or velocity of the stream from pump 32, the pressure or velocity differential will produce some " vacuum" type action in the injection process.

FIG. 3 shows a more complex system in which sewage sources 44, 46 are provided. In this system source 44 has more solids content than source 46, i.e., sewage source 46 may be confined to sewage effluent whereas source 44 may have considerable sludge or other solids content. As in the case in FIG. 2, the sewage sources may be of various types. In one example the source is a lagoon and sewage source 46 represents pumping effluent from the upper level of the lagoon and sewage source 44 comes from the lower level of the lagoon containing considerable sludge or other solids (even some grit although usually grit is separated from sewage before putting it in a lagoon). Sources 44, 46 are shown as having screen means 48, 50 and having pumps 52, 54. The outputs from pumps 52, 54 are joined at 56. If sufficient velocity can be given to the sewage by pumps 52, 54, no water may be added and the joined stream may be delivered directly to irrigation rig 10. If no water is added, the junction 56 may be injector means in which the liquid effluent is pumped at higher velocities and the sewage containing solids is pumped at lower velocities, the higher velocity effluent carrying the injected lower velocity sewage containing solids to rig 10 (in other words this would be the FIG. 2 system in which source 36 would be effluent instead of added water).

In the FIG. 3 showing, added water (from some water source) is provided at 60 and is pumped by pump 62 to injection means 64 wherein the sewage stream from the junction 56 is injected into the water stream to be carried thereby to irrigation rig 10. It is again presumed that the water is pumped at a higher velocity by pump 62 than the sewage is pumped by pumps 52, 54, as the need for the water stream (other than for purposes of dilution or added water to crops) is to provide velocity not obtained from the sewage stream.

The land area 22 preferably has a crop thereon (crops being defined as including grass for livestock and trees that can be cleared by conduit 14 in normal or elevated configuration) as my primary purpose is productive utilization of sewage. The irrigation rig is shown as having 360° circular coverage, although that is not necessarily the case, i.e., with end guns the corners of the square land tract can be substantially filled in or an oblong tract or one with obstacles may require pivoting of the rig less than 360°.

FIGS. 4 and 5 illustrate screening means 70 particularly adapted for handling sewage with considerable solids content, such as a lagoon with sludge settled to the bottom. The screening means 70 is substantially submerged in the sewage as indicated by the line representing a typical effluent level in FIG. 4. To insure gravity flow to screening means 70, the lower portion may be set in a well 72 below the normal level of the lagoon bottom indicated in FIG. 4. It will be understood this apparatus can be adapted to receive and screen the discharge from a sewage line, from a sewage disposal plant, or from the tank of a truck or car, if that is the source of sewage rather than a lagoon.

Screening means 70 is inclined to the horizontal plane. An inclined floor 74 formed of inclined spaced slats 76 extends between side members 78. The spacing of slats 76 determines the screening size. Although with, for example, ¼ inch slat spacing, an oblong solid could pass, i.e., ¼ inch × 2 inch, this is not a problem in nozzle clogging because common irrigation pressures are sufficient to ram occasional larger particles through the nozzles.

An inclined endless chain raddle 82 is carried by a pair of appropriately powered rotatable sprockets 84 at its upper end and by a pair of idler sprockets 86 at its lower end. The side endless chains 88 of raddles 82 are joined by lateral, horizontally disposed cross-bars 90 which act to convey to the upper end of screen floor 74 those particles too large to pass through that screening means, liquid and smaller size particles having fallen through the screening floor 74. The cross-bars 90 could be given limited alternate angling to promote some cross-wise movement of materials so that all materials may be exposed to the space between slats 76 for more efficient screening. The cross-bars 90 can also be provided with teeth located to match the openings between floor slats 76 to provide self-cleaning of the slatted floor. The powered motion of cross-bars 90 relative to the slatted floor, etc., can have some action to break up softer solids, as well as screen them, so the screening means 70 can have some action in reducing particle sizes.

An auger elevator, raddle-equipped chute or other transporting means 92 is disposed under the upper end of screening floor 74 and raddle 82 to receive unscreened solids from the upper end of the elevating flight of raddle 82. Those separated solids can be returned to the lagoon for further digestion, may be processed by a pulverizer to smaller size for recirculation through screening means 70, may be dumped into a truck for hauling to a solids disposal site, etc.

Figure 5:
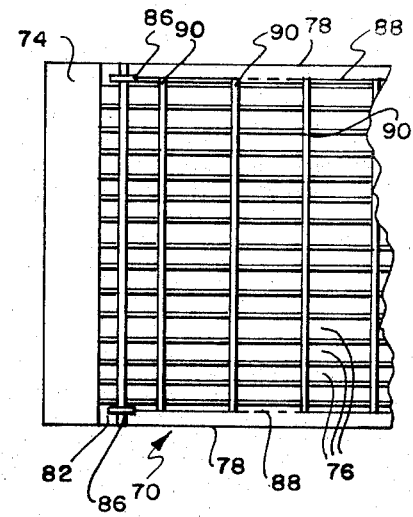
FIG. 5 is a partial top view of the screening means viewed in FIG. 4.
Figure 4:
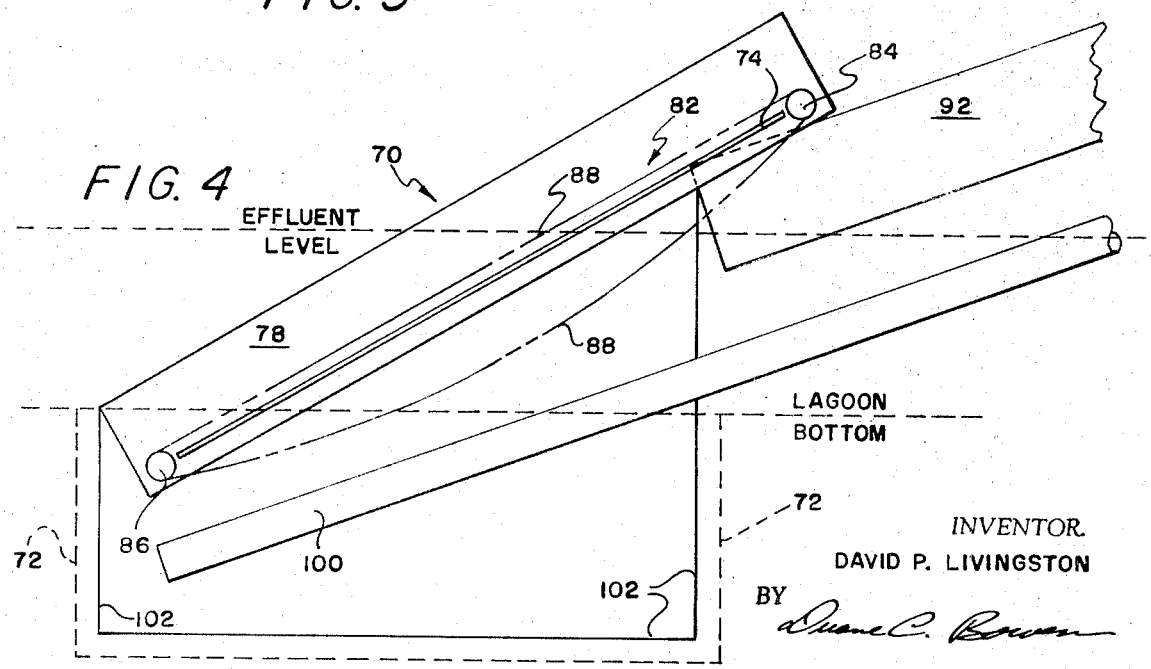
Figure 6:
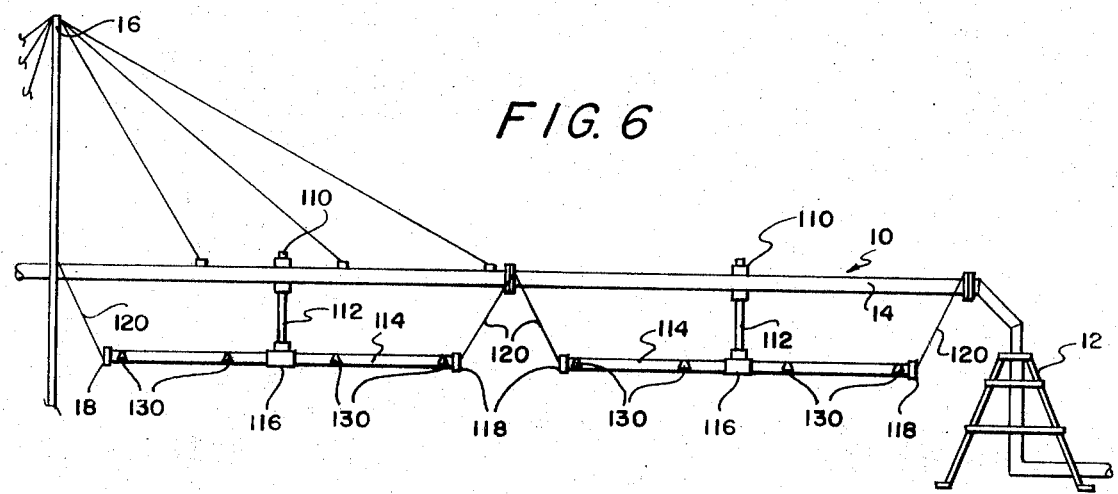
FIG. 6 is a partial side view of the irrigation rig viewed in FIG. 1 modified to a winter configuration.
Figure 7:
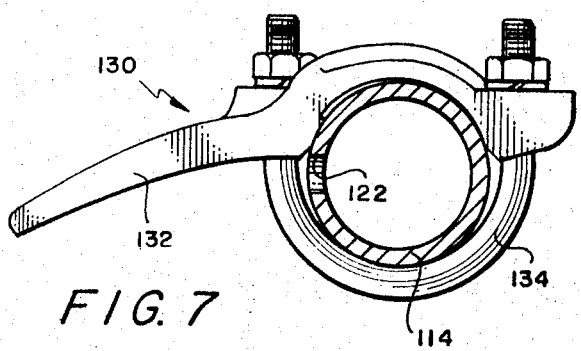
FIG. 7 is a sectional view through one of the horizontal pipes below the conduit and showing the structure of the spreader.
Figure 9:
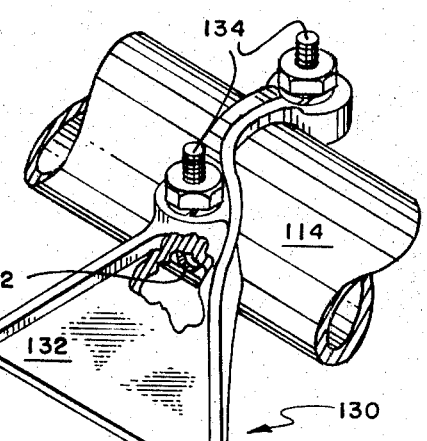
FIG. 9 is a perspective view of the structure shown in FIG. 7 with a portion of the spreader broken away to show the water outlet from the horizontal pipe.
Figure 8:
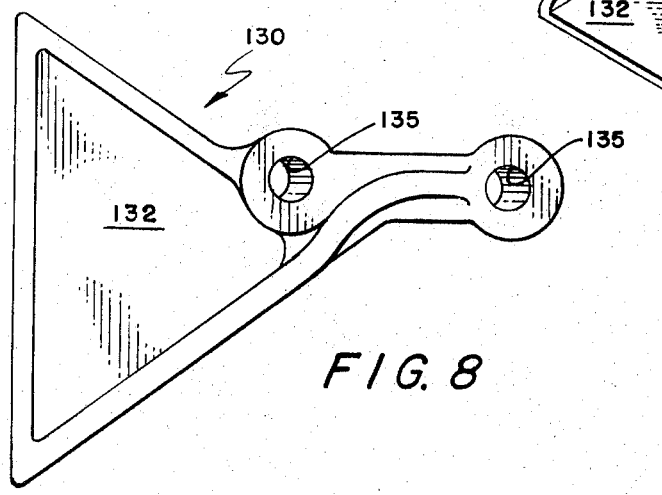
FIG. 8 is a top view of the spreader.

A suction conduit or other transport means 100 is disposed to transport screened material passing through the screen means 70 to the irrigation line. In the FIG. 2 showing, delivery would be to pump 38, and in the FIG. 3 showing, delivery would be to pump 52 or pump 54. Note in the case of only effluent being supplied as to pump 54 in FIG. 3, the screening means 70 would have a higher level to exclude solids well above the lagoon bottom if a lagoon were the sewage source. Effluent usually is termed to only include liquid (mostly water), so a screen would not necessarily be needed, although some screen means (whether as shown in FIGS. 4 and 5 or a more simple screen) preferably is used as a precaution against inadvertently picking up solids that might clog nozzles 20. The irrigation system described uses only pumpable sewage so the screening means 70 of FIGS. 4 and 5 is used with sewage (whether from a lagoon or otherwise) which will result in sewage in a pumpable condition reaching transport means 100. This means that member 100 will usually be a suction pipe or other device capable of delivering pumpable sewage to a pump. Of course the screening means 70 could be used for a different sewage processing operation in which the material collected under the screen means has too much solids to be pumpable, but that is not the application here.

A tank-like screened material container 102 is provided beneath screen floor 74 and connecting to sides 78 to prevent unscreened solids from reaching suction pipe 100. As liquids do not need to be prevented from entry, container 102 preferably has sides, ends and floor formed of material previous to liquids by being formed of screening material such as wire mesh or perforated plate material having openings no larger than the size of the screening means 70, i.e., ¼ inch square or ¼ inch diameter circular openings.

In some localities freezing conditions will be encountered and it will be desirable to continue sewage disposal, during such freezing conditions, although in some places sewage will be stored in lagoons or the like during freezing periods. In most localities, low temperatures during the winter will alternate with higher temperatures. Sewage disposal can be conducted in the normal manner of winter moisture to the soil (rains, snow and sleet, and thaws). In other words, I contemplate sewage disposal on land in winter on a regular schedule. If the irrigation sewage disposal on land in winter on a regular schedule. If the irrigation occurs at times when air and ground are below freezing temperatures, then the irrigation spray will form ice which will later thaw and enter the soil. The operators of the system should use judgment in this matter depending on usual local weather cycles, the terrain, any danger of contamination of the watershed by runoff, etc. If only a certain amount of moisture can be accommodated by the soil without danger of pollution of the watershed by too rapid thawing of too thick a layer of ice, then application of irrigation would be limited to that acceptable amount. There will be considerable variances in local conditions, so those designing each installation will have to define any needed limitations, if any. The problem has some similarity to the avoidance of of excessive irrigation in warmer weather. In general, application of sewage at a level in freezing weather similar to the level during warmer weather will be suitable, i.e., in areas having snow and ice most moisture is received into the soil during thawing and is an excellent method of introducing water into soil. In fact, a major part of moisture received in soil in some areas is from moisture falling on the land during cold winters.

Special adaptation of irrigation rig 10 is needed during freezing periods and FIGS. 6–9 show a winter configuration. The upstanding nozzles 20 seen in FIG. 1 are removed and plugs 110 are installed. Preferably directly below the locations of nozzles 20 or plugs 110 are openings. These openings are common in pivotal irrigation rigs and have automatic drains installed therein, which have a spring biased valve which opens to unload water from conduit 14 except when the water is pressurized for irrigation. For the winter condifuration, the automatic drains are removed from these openings and vertical depending pipes 112 are installed in the openings. Horizontal pipes 114 are connected to vertical pipes 112 by tee-couplings 116. The ends of horizontal pipes 114 have caps 118 and those ends may be supported from conduit 14 by diagonal guy cable braces 120. Horizontal pipes 114 will have automatic drains fitted thereto, but they are not illustrated as they are common to irrigation conduits, as stated above. Sprinkling during irrigation from side openings 122 is facilitated by spreaders 130. Spreaders 130 include baffles plates 132 against which the streams from openings 122 impinge breaking up and spreading the streams so that sprinkling is achieved somewhat comparable to sprinkling from nozzles 20 in FIG. 1. Spreaders 130 are secured to horizontal pipes 114 by U-bolts 134. Openings 135 for U-bolts 134 in spreader 130 are in a plane spaced from the plane of sprinkler openings 122.

The operation of my equipment has been incorporated into the above description. I have provided means and method of disposal of pumpable sewage on agricultural land by irrigation sprinkling with a continuously moving irrigation rig facilitating sewage disposal on sizable land areas in the form of sprinkle irrigation without puddling and in a manner consistent with efficient usage of sewage liquids and solids for crop productivity and with a minimum of operator time and other costs, to the end not only of minimum if any disturbance to good ecology in sewage disposal but also of good economic utilization of the resource for crop production of sewage liquids and solids.

Having thus described my invention, I do not wish to be understood as limiting myself to the exact details of the specific embodiment but instead I wish to cover those variations thereof which will occur to those skilled in the art upon learning of my invention, and properly within the scope of my invention.

I claim:

1. Means for sewage disposal comprising:
   a. an area of land to be irrigated
   b. sprinkler means on said area of land, said area of land being too large to be covered by said sprinkler means in a single stationary position
   c. said sprinkler means being a mobile, self-propelled, automatic, rotary irrigation rig including a pivot tower, a conduit pivoting about said pivot tower, a series of supports spaced along the length of said conduit, and a series of nozzle means spaced along said conduit, said supports each including traction and support means such as wheel means and having power means connected to said traction and support means operative to continuously power said sprinkler means and said sprinkler means being operative to irrigate said area of land unattended by an operator during a cycle in which said conduit continuously, pivotally moves so that said nozzle means move in arcs to gradually and progressively irrigate adjacent circular sectors of said area until all of said area has been covered, said nozzle means being set to sprinkle progressively more sewage in series out from said pivot tower so that all of said area receives about the same amount of irrigation
   d. a source of sewage components in liquid form capable of being pumped
   e. pump means connected to said source and to said pivot tower and operative to pump said sewage components from said source to said sprinkler means to irrigate said area of land thereby
   f. control means for said pump and sprinkler means set to deliver said sewage components to said sprinkler means, to sprinkle said sewage components from said sprinkler means, and to move said sprinkler means at rates preventing puddling on said land avoiding puddles in which putrescence can occur and in which bacterial activity can occur in puddle conditions as distinguished from in-soil conditions, and
   g. freezing configuration means for each nozzle means including upper nozzle outlet means on top of said freezing configuration, and each nozzle means including a lower outlet means in said conduit below said upper outlet means from which said nozzle means depends in said freezing configuration so as to drain said conduit and nozzle means against freezing in freezing conditions after a sprinkling cycle has been completed.

2. The subject matter of claim 1 in which said nozzle means includes a vertical pipe connected to and depending from each lower outlet means, a horizontal pipe connected to the lower end of said vertical pipe, and said horizontal pipe having outlet openings for sprinkling therefrom.

3. The subject matter of claim 2 in which said outlet openings open to the side of said horizontal pipe and a spreader attached to said horizontal pipe for each outlet opening having a baffle breaking up and spreading flow emerging from said outlet opening.

4. The subject matter of claim 2 in which said horizontal pipe joins said vertical pipe in a tee manner and there are guys secured between the end portions of said horizontal pipe and said conduit to brace the same.

5. Means for sewage disposal comprising:
   a. an area of agricultural land to be irrigated
   b. sprinkler means on said area of land, said area of land being too large to be covered by said sprinkler means in a single stationary position
   c. said sprinkler means being automatic, mobile and selfpropelled and having traction and support means such as wheel means and having power means connected to said traction and support means operative to continuously power said sprinkler means and said sprinkler means being operative to irrigate said area of land unattended by an operator during a cycle in which said sprinkler means continuously moves to gradually and progressively irrigate adjacent portions of said area until all of said area is irrigated
   d. a source of sewage components in form capable of being pumped
   e. pump means connected to said source and to said sprinkler means and operative to pump said sewage components from said source to said sprinkler means to irrigate said area of land thereby
   f. control means for said pump and sprinkler means set to deliver said sewage components to said sprinkler means, to sprinkle said sewage components from said sprinkler means, and to move said sprinkler means at rates productively irrigating said land for agricultural purposes and preventing puddling on said land avoiding puddles in which putrescence can occur and in which bacterial activity can occur in puddle conditions as distinguished from in-soil conditions
   g. said sprinkler means including nozzles
   h. said source including screen means screening out solids from said source which are too large to be passed by said nozzles, said screen means including slanted screen means, an inclined endless conveyor having cross-bar means passing in an upwardly inclined flight along the upperside of said slanted screen means to convey solids deposited on said screen means and not passed therethrough to the upper end of said conveyor and screen, transporting means receiving said solids from said conveyor and discharging said solids away from said screen means, and conveying means below said screen means receiving liquid and solids passing through said screen and delivering the same to said pump means.

6. Means for sewage disposal comprising:
   a. an area of agricultural land to be irrigated
   b. sprinkler means on said area of land, said area of land being too large to be covered by said sprinkler means in a single stationary position
   c. said sprinkler means being automatic, mobile and selfpropelled and having traction and support means such as wheel means and having power means connected to said traction and support means operative to continuously power said sprinkler means and said sprinkler means being operative to irrigate said area of land unattended by an operator during a cycle in which said sprinkler means continuously moves to gradually and progressively irrigate adjacent portions of said area until all of said area is irrigated d. a source of sewage components in form capable of being pumped e. pump means connected to said source and to said sprinkler means and operative to pump said sewage components from said source to said sprinkler means to irrigate said area of land thereby f. control means for said pump and sprinkler means set to deliver said sewage components to said sprinkler means, to sprinkle said sewage components from said sprinkler means, and to move said sprinkler means at rates productively irrigating said land for agricultural purposes and preventing puddling on said land avoiding puddles in which putrescence can occur and in which bacterial activity can occur in puddle conditions as distinguished from in-soil conditions g. said source including sewage effluent source means and pumpable sewage source means having liquid and solids components h. said pump means including a first pump for said effluent source means and a second pump for said pumpable sewage source means and the output from said first and second pumps joining intermediate said pump means and said sprinkler means whereby said effluent assists in keeping said solids components in suspension until distributed by said sprinkler means.

7. The subject matter of claim 6 in which there is water source means and a third pump connected to said water source means operating at a higher velocity than said first and second pumps, and injection means interposed between said pumps and said sprinkler means injecting the output of said first and second pumps into the stream of water moving at said higher velocity from said water source means whereby said water assists in keeping said solids components in suspension until distributed by said sprinkler means.

8. Means for sewage disposal comprising:

a. an area of agricultural land to be irrigated b. sprinkler means on said area of land, said area of land being too large to be covered by said sprinkler means in a single stationary position c. said sprinkler means being automatic, mobile and selfpropelled and having traction and support means such as wheel means and having power means connected to said traction and support means operative to continuously power said sprinkler means and said sprinkler means being operative to irrigate said area of land unattended by an operator during a cycle in which said sprinkler means continuously moves to gradually and progressively irrigate adjacent portions of said area until all of said area is irrigated d. a source of sewage components in form capable of being pumped e. pump means connected to said source and to said sprinkler means and operative to pump said sewage components from said source to said sprinkler means to irrigate said area of land thereby f. control means for said pump and sprinkler means set to deliver said sewage components to said sprinkler means, to sprinkle said sewage components from said sprinkler means, and to move said sprinkler means at rates productively irrigating said land for agricultural purposes and preventing puddling on said land avoiding puddles in which putrescence can occur and in which bacterial activity can occur in puddle conditions as distinguished from in-soil conditions g. water source means h. said source of sewage components including pumpable sewage source means having solids and liquid components i. said pump means including a first pump connected to said water source means operating at a higher velocity and a second pump connected to said pumpable sewage source means operating at a lower velocity and injection means connected to and interposed between said pumps and said sprinkler means, said injection means injecting material at said lower velocity from said pumpable sewage source means into the stream of water moving at said higher velocity from said water source means whereby the solids components remain in suspension until distributed by said sprinkler means.

9. The subject matter of claim 8 in which there is a container enclosing the lower side of said screen means and conveying means to prevent solids from entering said conveying means except through said screen means.

10. The subject matter of claim 9 in which said container is formed of material pervious to liquid so that liquid can enter said conveying means without passing through said screen means.

11. The subject matter of claim 8 in which said source includes a lagoon containing sewage and said lagoon has a well receiving the lower end of said screen means whereby there is positive gravity feed of sewage from said lagoon to said screen means.

12. The subject matter of claim 8 in which said screen means is a floor with spaced apart slats and said conveying means is a suction conduit.

13. Means for sewage disposal comprising:

a. an area of agricultural land to be irrigated b. sprinkler means on said area of land, said area of land being too large to be covered by said sprinkler means in a single stationary position c. said sprinkler means being automatic, mobile and selfpropelled and having traction and support means such as wheel means and having power means connected to said traction and support means operative to continuously power said sprinkler means and said sprinkler means being operative to irrigate said area of land unattended by an operator during a cycle in which said sprinkler means continuously moves to gradually and progressively irrigate adjacent portions of said area until all of said area is irrigated d. a source of sewage components in form capable of being pumped e. pump means connected to said source and to said sprinkler means and operative to pump said sewage components from said source to said sprinkler means to irrigate said area of land thereby f. control means for said pump and sprinkler means set to deliver said sewage components to said sprinkler means, to sprinkle said sewage components from said sprinkler means, and to move said sprinkler means at rates productively irrigating said land for agricultural purposes and preventing puddling on said land avoiding puddles in which putrescence can occur and in which bacterial activity can occur in puddle conditions as distinguished from in-soil conditions g. liquid source means having only liquids h. said source of sewage components including pumpable sewage source means having both solids and liquid components, said pump means including a first pump connected to said liquid source means and a second pump connected to said pumpable sewage source means and said first and second pumps having output lines joining intermediate said pump means and said sprinkler means whereby the addition of liquid from said liquid source means assists in delivering said solids components to said sprinkler means.

14. The subject matter of claim 13 in which said liquid in said liquid source consists solely of water.

15. The subject matter of claim 13 in which said liquid in said liquid source is part of said source of sewage components and consists solely of sewage effluent.

16. The subject matter of claim 15 in which there is a source consisting solely of water, a third pump for said water, and said third pump having an output line joining said output lines from said first and second pumps intermediate said pump means and said sprinkler means whereby the addition of water assists in delivering said solids components to said sprinkler means.

17. The subject matter of claim 13 in which there is injection means at the joinder of said output lines in which said output line from second pump is injected in a downstream direction within the stream from said output line from said first pump in an injection manner.

* * * * *